United States Patent
Partridge et al.

(10) Patent No.: US 8,332,180 B2
(45) Date of Patent: Dec. 11, 2012

(54) DETERMINING USER COMPASS ORIENTATION FROM A PORTABLE DEVICE

(75) Inventors: Kurt E. Partridge, Palo Alto, CA (US); Kai Kunze, Oberhausen (DE); Maurice K. Chu, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 503 days.

(21) Appl. No.: 12/553,839

(22) Filed: Sep. 3, 2009

(65) Prior Publication Data

US 2011/0054834 A1    Mar. 3, 2011

(51) Int. Cl.
*G01C 9/00* (2006.01)
*G01C 17/00* (2006.01)
(52) U.S. Cl. ..................................... 702/150
(58) Field of Classification Search .................. 702/150
See application file for complete search history.

(56) References Cited

U.S. PATENT DOCUMENTS

| | | | |
|---|---|---|---|
| 7,647,196 B2 * | 1/2010 | Kahn et al. | 702/149 |
| 2008/0249740 A1 * | 10/2008 | Verhaert | 702/160 |
| 2010/0049469 A1 * | 2/2010 | Wirola et al. | 702/150 |
| 2010/0076720 A1 * | 3/2010 | Mori et al. | 702/150 |
| 2010/0292921 A1 * | 11/2010 | Zachariah et al. | 701/209 |

OTHER PUBLICATIONS

Liao, Lin et al., "Learning and Inferring Transportation Routines", Apr. 2007, "Artificial Intelligence", vol. 171, Issues 5-6.
Kunze, Kai et al., "Where am I: Recognizing On-Body Positions of Wearable Sensors", Sep. 16, 2007, Innsbruck, Austria, http://www.springer.com/computer/communications/book/978-3-540-74852-6.
Kunze, Kai et al., "Symbolic Object Localization Through Active Sampling of Acceleration and Sound Signatures", May 12, 2005, Oberpfaffenhofen, Germany, http://www.kn-s.dlr.de/loca2005/.

* cited by examiner

*Primary Examiner* — Michael Nghiem
(74) *Attorney, Agent, or Firm* — Shun Yao; Park, Vaughan, Fleming & Dowler LLP

(57) ABSTRACT

An orientation-determining system determines a person's compass orientation from data generated by one or more sensors embedded within a portable device transported by the person. In some scenarios, the system uses the person's initial orientation to calculate an initial orientation delta describing a difference between the person's initial orientation and an initial orientation of the device. In other scenarios, the system calculates the person's current orientation based on an initial orientation of the device and a known or assumed orientation delta. The system can apply the orientation delta to the device's current orientation to determine the person's current orientation. The system can update the orientation delta based on any changes to the orientation of the person or the device.

18 Claims, 3 Drawing Sheets

DETERMINING USER COMPASS ORIENTATION FROM A PORTABLE DEVICE

BACKGROUND

This invention relates to the fields of computing devices and sensors. More particularly, methods and apparatus are provided for determining a person's absolute compass orientation from a portable electronic device.

Methods and devices for determining a person's location are known. Some solutions employ GPS (Global Positioning System) technology, while others use RFID (Radio Frequency Identification), WiFi (Wireless Fidelity), UWB (Ultra-Wideband) or other components.

Although these schemes may reveal a person's absolute location, they are unable to discover his or her orientation—e.g., which direction he or she is facing. Such information may be very useful to determine the person's interest (e.g., which product or products he is examining) or observation (e.g., whether she is likely to have seen something).

In addition, systems for determining a person's location generally require a number of cooperating components that are not co-located. Specifically, most systems rely upon triangulation of one or more electronic signals, whether from a GPS satellite, an RFID emitter, a WiFi access point, a UWB node or other device, and multiple transmitters and/or receivers are required to correlate and disambiguate the signals and the information conveyed by the signals.

SUMMARY

In some embodiments of the invention, apparatus and methods are provided for determining a person's compass orientation (i.e., the direction in which he is facing) via a portable electronic device carried or worn by that person, such as a telephone or a personal digital assistant. In these embodiments, the device comprises one or more sensors or sensor components, such as an accelerometer, a GPS (Global Positioning System) receiver, a magnetometer (e.g., a compass), etc.

In some embodiments, a person's initial orientation is directly determined from the device's sensors and, along with the device's orientation, is used to calculate an initial orientation delta. For example, when the person is known to be walking in a specific direction, it may be assumed that he is facing that direction. The calculated orientation delta can be used later (e.g., when the person stops or turns) to calculate his current orientation from the device's current orientation.

In other embodiments, the person's current orientation is calculated based on an orientation of the device and a known or assumed orientation delta describing a difference between the device's orientation and the person's orientation. Illustratively, the assumed orientation delta may be associated with a particular event—such as turning the device on, using the device, sitting down, and so on.

As events involving the person and/or the device are observed, orientation data can be updated or recalibrated. In particular, some movements of the device (or the person) may cause the orientation data to become invalid, meaning that the person's orientation cannot be currently determined because his orientation relative to the device is no longer known. Illustratively, this may occur if the device is turned off or is moved in a manner that does not comport with any events the device is programmed to recognize. However, when the user's compass orientation again becomes observable or derivable directly from sensor data, or a later event indicates a specific orientation delta, the orientation data may be updated to reflect the user's (and device's) current state.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for determining a user's compass orientation (e.g., which direction he or she is facing), based on sensor data collected by a portable device accompanying the user, such as a telephone or a personal digital assistant (PDA). Except where indicated otherwise herein, reference to a user's orientation refers to the direction in which his or her torso is facing.

In some embodiments, initial orientations of the device and the user are determined, from which the difference in their orientation (e.g., an "orientation delta") can be calculated and later used to determine the user's orientation from the device's orientation at that time. In other embodiments, an initial orientation delta may be perceived or assumed based on a device event (e.g., use or activation of the device), and the user's initial orientation is derived therefrom.

Based on subsequent detected events, the orientation of the device, the orientation of the user and/or an orientation delta may be re-calculated. Such events may include walking, sitting, adjusting a position of the device, use of a device function, etc.

Figure 1:
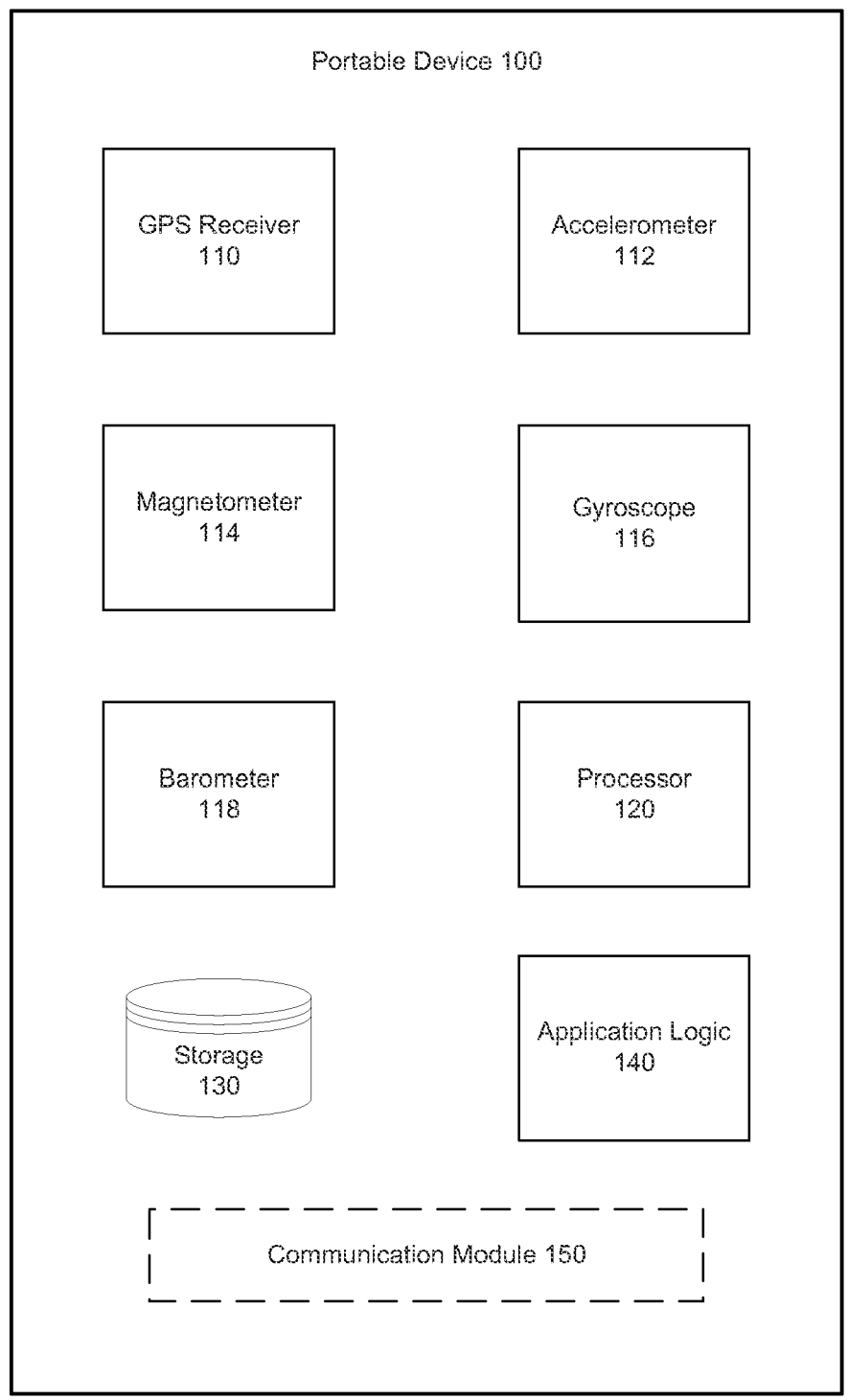
FIG. 1 block diagram of a portable device with which a user's compass orientation may be determined, according to some embodiments of the invention.

FIG. 1 is a block diagram of a portable device with which a user's compass orientation may be determined, according to some embodiments of the invention. MEMS (Micro-Electro-Mechanical Systems) technology may be employed to produce any or all of the identified components of the device small enough for use in a wide range of portable devices (e.g., telephones, PDA, barcode scanners, pagers).

Portable device 100 includes multiple sensors for identifying a position, detecting movement or a change in altitude, identifying an orientation and/or otherwise determining a status or state of the device. Such sensors may include GPS receiver 110, accelerometer 112, magnetometer 114, gyroscope 116 and barometer 118.

In other embodiments of the invention, a portable device for determining a user's compass orientation may include a subset or a superset of these components. For example, magnetometer 114 and gyroscope 116 may be combined in a gyrocompass. As another example, GPS receiver 110 may be omitted and movement may be detected and/or tracked via other sensors. Illustratively, only one of each type of sensor (e.g., for location, for movement, for orientation, for air pressure) need be included in the device.

GPS receiver 110 receives signals from GPS satellites, and may be used to determine a current location of portable device 100, and/or to track its movement over time. Accelerometer 112 measures linear acceleration of device 100 relative to a freefall state. Depending on its number of axes (i.e., one-, two- or three axes), the accelerometer may be sensitive to movement in some or all directions.

Magnetometer 114, which may be a compass, determines an orientation of device 100 relative to magnetic north. This observation may be converted to an orientation relative to true north if corrected for the local magnetic deviation. In some embodiments, magnetometer 114 operates in three dimensions. Gyroscope 116 may be used to measure changes in the device's orientation, particularly with regard to angular momentum or rotation, and is immune to any magnetic anomalies that may affect magnetometer 114.

Barometer 118 measures ambient air pressure in the vicinity of device 100 and may be used to sense changes in altitude. As described above, barometer 118 may be omitted in some embodiments of the invention.

Portable device 100 also includes processor 120 for analyzing or otherwise processing output from any or all of the sensor components. Storage 130 is used to store sensor data, sensor data patterns indicative of known events, an orientation delta and/or other data.

The portable device may further include (e.g., in storage 130) logic to be executed by processor 120 to operate the sensor components, manipulate or maintain data, calculate the user's orientation, etc. Yet further, the portable device may comprise application logic 140 for any number of application programs, add-ons, applets and so on.

Such application logic may use data from the sensor components and/or calculated orientation data for various purposes, such as to help infer participation in a conversation (e.g., based on multiple people being located in proximity and facing each other), assist in navigation (e.g., to tell a user which direction to turn and where to travel to reach a particular destination), identify what a user is looking at, etc. Application logic may also, or instead, execute on a separate device or system and use data received from portable device 100.

Optional communication module 150 may be implemented to transmit raw or processed data from one or more of the sensor components (or storage 130) to equipment external to portable device 100 (e.g., a computing device). Thus, sensor data may be processed or analyzed on the device (with processor 120) and/or off the device to determine a user's orientation from the sensor data. Illustratively, communication module 150 may comprise or be part of a communication component of the device (e.g., a cellular transmitter within a telephone) that is not pictured in FIG. 1.

From any or all of sensor components 110-118, location, orientation, movement, altitude and/or other statuses of portable device 100 can be determined. For example, regardless of whether the device is being carried in the user's pocket or hand, being worn on his belt or is being transported in a backpack, the direction of North can be accurately determined (e.g., from magnetometer 114), the device's location can be identified (e.g., by GPS receiver 110) and movement (i.e., acceleration, rotation) of the device can be detected (e.g., by accelerometer 112, by gyroscope 116).

In embodiments of the invention described herein, an orientation of a user is identified or calculated based on sensor data. Such an orientation may be absolute or relative to the device. From an absolute orientation, the user's relative orientation to the device can be determined, and vice versa. The user is assumed to remain in a particular orientation relative to the device until sufficient contradictory sensor data are observed.

More specifically, data are collected by the device (e.g., by sensors 110-118 of portable device 100 of FIG. 1), and then compared against data that are indicative of various device or user orientations or states. If the data match a particular state (e.g., walking, running, sitting, turning the device on, using the device), the user's absolute orientation or relative orientation as compared to the device can be calculated or directly observed. She may be assumed to maintain a particular absolute or relative orientation until data are observed that indicate that she and/or the device have transitioned to a different state or to an unknown state.

In some embodiments of the invention, a device is "trained" via machine learning to recognize particular states, actions or events. In these embodiments, multiple sets of sensor data are collected while users transporting sensor-equipped devices enter a specific state or take specific action. By processing many sets of sensor data reflecting that state or action, a device can be taught to identify, in real-time, a sensor data pattern indicative of that state.

In some embodiments of the invention, one known state that can be used to calibrate a user's compass orientation relative to the orientation of her portable device is associated with the human activity of walking. In these embodiments, the user is determined to be moving based on data collected from a GPS receiver or other component capable of reporting an absolute or relative position. As long as she moves a sufficient distance, the GPS receiver or other sensor can track her movement over time.

Even without a GPS receiver component, a device equipped with an accelerometer may be able to recognize a user's walking motion. In particular, and as described above, through machine learning the device may be able to recognize a pattern of accelerometer data produced by a typical walking motion. Some degree of variance from a typical or average walking pattern may be observed while still allowing the action to be correctly attributed to walking action.

Various spurious movements of the device may be observed without violating the assumption that the user is walking, because the learning data will reflect the same type of movements—such as sliding or rotation of the device in the user's pocket. Yet further, data profiles of walking movement may be captured for different device locations (e.g., pants pocket, shirt pocket, in hand, in purse), so that the device can recognize its state even when carried in different manners.

Once the user is determined to be walking, if she moves in the same direction for a meaningful period of time or for a meaningful distance, it can be assumed that she is facing the direction in which she is moving, as people generally do not walk backwards or sideways for more than a short distance.

Because the orientation of the user (i.e., toward the direction of movement) and the orientation of the device (i.e., as measured by one or more orientation sensors within the device) are both known, a delta representing the difference in their orientations can be calculated.

Determining the device's current orientation may require the device to first identify a reference vector, such as a gravity vector. By averaging or filtering accelerometer data over time, the true gravity vector (i.e., downward) can be distinguished from other acceleration vectors and used as a reference. The horizontal plane in which the user's walking (and facing) action primarily occurs will be perpendicular to the gravity vector.

Until sensor data indicate that the position or orientation of the device has changed relative to the user, or vice versa, it may be assumed that her orientation can continue to be derived from the device's orientation. Thus, even as she changes direction or pauses in her movement, her orientation can be determined from the device's orientation.

Movement of the device in a manner not compatible with normal walking motion, as detected by one or more device sensors, may cause the user's state to become unknown, meaning that her orientation relative to that of the device is now uncertain. For example, if she removes the device from her pocket and waves it around or drops it, the device will no longer attribute the corresponding sensor data with the action of walking.

The initial assumption that she is walking may be bolstered or disproved based on further analysis of her movement. For example, if she is moving rapidly, then she is probably being conveyed in some kind of vehicle instead of walking, and more information may be needed to determine whether she is facing the direction of movement.

As described below, she may be determined to be in another known state in which her orientation can be determined (e.g., sitting still, standing still), or possibly in an unknown state. For example, if she is determined to be driving, she is still likely to be facing the direction of movement. Conversely, if seated on a train or a bus, she may be sitting in a position facing perpendicular or reverse to the direction of travel.

In some embodiments of the invention, a user may be determined to be riding in public transportation (e.g., a bus, a train) based on the device's location and a pattern of stops, turns and/or other actions. In particular, the detected actions may be compared with a route map of a bus or a train.

However, even if the user is being conveyed in a train or other large conveyance, she could be walking within it. Therefore, the accelerometer data may be useful regardless of whether the rate of movement observed by a location sensor (e.g., a GPS receiver) is too high to be solely attributable to walking.

Once the user's orientation relative to her device's orientation is calculated, some events (e.g., user actions) can be recognized by the sensor data that accompanies the event, and used to modify that orientation delta. For example, if the device is being carried in her pocket and she sits down, an orientation sensor will detect a ninety degree change in orientation, followed by relative stillness. This pattern of data (e.g., from an accelerometer) may match a profile of a sitting action, and provide confidence in a newly calculated orientation delta.

If she is assumed to now be in a sitting position, she is likely to be facing forward, and so the ninety degree change in orientation can be applied (in the appropriate axes) to the previous delta to obtain a new delta, and her compass orientation can continue to be derived from the device's orientation.

More specifically, the user's torso may be assumed to be parallel to the direction of gravity just before she sits down. Then, as she sits and the gravity vector changes (e.g., as detected through a low-pass filter applied to an accelerometer), the orientation of her torso can still be determined, even though the relative positions of her torso and the device have changed.

Because a small device such as a cellular telephone may be carried or stored in different manners and positions, a polarity problem may be encountered if the device is not properly trained. In particular, when the device is placed in the user's pocket, it may be facing inward or outward, upward or downward. Its absolute orientation can be determined from its internal sensors, but if the "face" or front of the device is aligned opposite to a direction in which the user is moving, isolated sensor data may be ambiguous. Thus, the user may be walking backward with the device facing forward (or may be facing backward on a conveyance), or may be walking forward with the device facing backward.

Polarity will not be an issue if the device is correctly trained via sensor data reflecting specific polarities, as accelerometer (or other) sensor data will differ depending on which direction the device is facing.

In some embodiments of the invention, another event that allows for determination of a user's orientation occurs when he turns the device on. In particular, it may be assumed the device is facing the user at this time, especially if the "on" button or control is located on the face of the device. Analysis of different devices (e.g., size, shape, location of controls) may be used to determine a likely orientation of the device relative to a person that turns it on.

By applying this probable or assumed initial delta in user/device orientation to the device's initial orientation as it is turned on (i.e., as reported by the device's internal sensors), the user's initial orientation can be determined. When the device is moved to a location in which it is transported or carried by the user (e.g., in his hand, in his pocket, clipped to his belt), the difference in the device's new resting orientation versus its initial orientation can be used to modify the initial delta. As a result, until sensor data indicate that the device or the user has taken on an altered orientation, the user's orientation can be readily derived from the device's orientation, even as the user turns or moves.

Besides simply detecting when the device is turned on, one or more device sensors may be used to garner further information regarding whether the assumed initial orientation delta is accurate. For example, as the device turns on, it may vibrate a short while. Data produced by an accelerometer within the device during this action will differ depending on whether the device is in contact with an object that is relatively soft (e.g., as when the device is held in the user's hand) or relatively hard (e.g., when the device is laying on a table or other solid surface). Thus, this data may or may not support an assumption that the device is being turned on while being held facing the user.

Yet another event that can be used to select an assumed initial orientation delta and determine a user's initial orientation is actual use of the device. For example, when a cell phone is used to make or receive a call, and no external device is used for the audio (e.g., a wired or wireless headset), and a speakerphone option is not activated, the user is likely holding the phone in a manner in which the speaker and microphone are close to parallel to her ear and the direction she is facing.

The device's specific orientation will differ depending on which ear she is using, but in either case, usually a portion of the device comprising the microphone will be relatively close to her mouth, while a part comprising the speaker will be relatively close to her ear. Thus, from an angular orientation of the device it can be determined on which side of her head she is holding the device, and therefore an orientation delta between her torso and the device can be calculated.

In embodiments of the invention described herein, once a delta is calculated (or assumed) between the device's orientation and the user's orientation, that delta can be applied to the device's current orientation to identify the user's current orientation, as long as the device orientation does not change or only changes in predictable ways while the user moves. For example, when the user is determined to be walking, allowance can be made for variations from sensor data normally associated with walking, if such variations can be ascribed to sliding of the device in a pocket, rotation of the device as the user's legs move, normal deflection of his arm upward or downward as he holds the device, etc.

Yet further examples of movement that the sensors may report and that need not place the user's orientation into an unknown state include climbing stairs, riding an elevator, sitting down, standing up, etc. All of these actions, and others, can be identified via analysis of sensor data and/or comparison with data patterns associated with known events that can occur while the device and the user are separated by the same delta.

Detection of different states may require different sensor data. For example, to accurately assume that the user is ascending an elevator (e.g., instead of simply standing still), data from a barometer may be needed.

Figure 2:
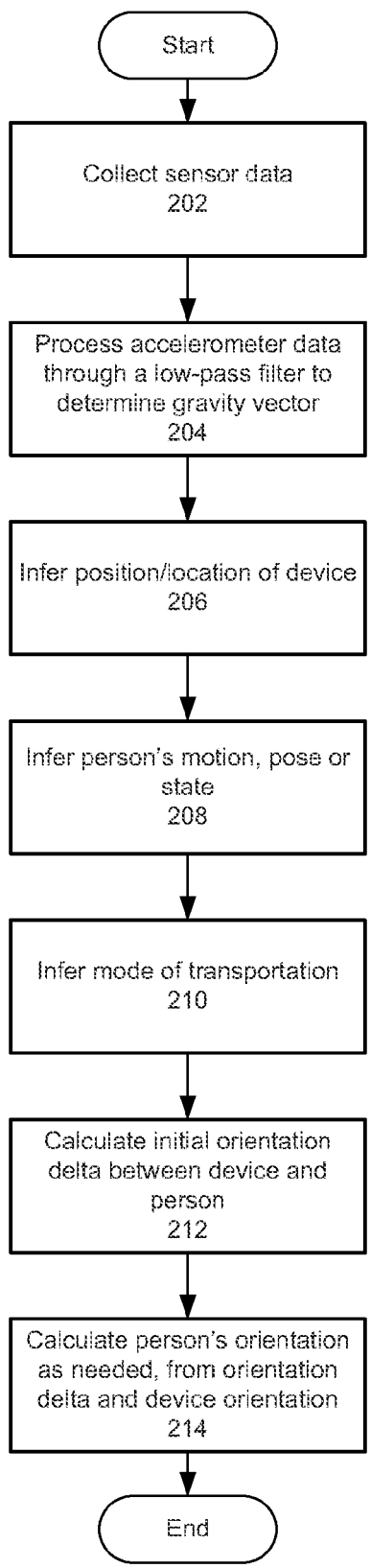
FIG. 2 is a flowchart illustrating one method of determining a person's compass orientation from sensor data generated by a portable device transported by the person, in accordance with some embodiments of the invention.

FIG. 2 is a flow chart demonstrating a method of inferring a person's compass orientation (e.g., the direction he is facing) from a portable device carried by the person, according to some embodiments of the invention. The device includes some or all of a 3-axis accelerometer, a GPS receiver (or other location sensor) a magnetometer (or compass), a gyroscope and a barometer.

In some embodiments of the invention, one or more operations described in FIG. 2 may be omitted or may be divided into multiple sub-operations.

In operation 202, data are collected from some or all of the sensors over some period of time (e.g., 1 second, 5 seconds, 10 seconds). For example, a sliding window is used to view periodic or continual collections of data from all three axes, meaning that for each of multiple discrete points in time, accelerometer data from all axes are captured.

Data from the 3-axis accelerometer provides information regarding changes in the person's acceleration, GPS provides positional data, the magnetometer gives the device's compass heading, the gyroscope helps determine angular velocity (and can help identify anomalous magnetometer readings that can be ignored), and the barometer allows changes in the person's altitude to be detected.

In operation 204, some initial data processing is performed. For example, the accelerometer data are filtered or averaged over time, in order to identify the gravity vector. In particular, by averaging the data over time, spurious accelerations due to forces other than gravity are filtered out. In addition, the accelerometer data may be combined with gyroscopic data to yield a more accurate compass heading relative to the device.

In operation 206, a location of the device on or near the person's body may be inferred, if possible. In some embodiments of the invention, this inference may be drawn from sensor data and/or observation of activation of a device function separate from the sensors.

For example, and as described above, during a telephone call (without headset or speakerphone), an orientation of the device relative to the person's head and body may be assumed—the device will likely be pitched vertically, with an angular orientation parallel to an imaginary line between the person's mouth and ear.

Also as described above, observed accelerometer data may match a pattern learned to be indicative of walking motion with the device in the person's pocket. Even if not carried in a pocket, observed accelerometer data may match a "muted" walking pattern indicating that the person is walking while carrying the device in a purse, backpack or other container.

Further, use of the device while walking may be detected through a combination of the above—a call is in progress, the device is angled as would be expected during use, and may pitch forward and backward in time with the person's steps.

Transition of the device from one position to another may be observed and allow inference of the device's new position. More specifically, during or after use of the device (e.g., to make a call), the device may be moved in a way that produced other distinctive accelerometer data. For example, the typical rotation and displacement of the device to place it into a pocket after finishing a call may be recognized, especially if the movement is followed by a bit of jostling (e.g., as the device settles in the pocket) or is followed by accelerometer data that reflects walking.

A relatively long period without acceleration or other movement in the device may indicate that the device has been set down. By vibrating the device and examining resulting accelerometer data to see how much of the vibration is damped, some assumption may be able to be made about what type of surface it has been placed on (e.g., skin damps vibration more than wood or metal).

In operation 208, a state or status of the person may be inferred, such as walking, running, standing still, sitting, traversing stairs, riding an elevator or escalator, reclining, etc.

As described previously, in some embodiments of the invention, detection of a particular motion or activity may be identified through machine learning, wherein the device learns to recognize distinctive patterns of sensor data. If a perceived pattern of data does not have sufficient correlation with any known profile, it may be assumed the person is in an unknown state, and his orientation relative to the device currently cannot be calculated.

In other embodiments, heuristics may be applied to identify a status of the person. For example, a "walking" rule may allow an assumption that the person is walking if a high amount of energy is detected around walking frequencies (e.g., a frequency with which a person takes steps), but little energy is detected at other frequencies. A "sitting" rule may specify that the person is assumed to be sitting if his previous state was "standing" and a ninety degree change in orientation of the device was observed, especially if the device was determined or inferred to be in a pants pocket.

More complex rules may be defined to include signal phase information or additional signal characteristics in a time domain and/or a frequency domain.

In operation 210, a transportation mode may be inferred, such as pedestrian (e.g., walking, sitting, standing), automobile, airplane, other transport (e.g., train, bus, boat). Illustratively, transportation in some types of conveyances (e.g., car, train, bus, boat, airplane) may be inferred through a rate of movement reflected in GPS data. Although the GPS component may be turned off for travel in an airplane, accelerometer data indicative of acceleration to the speed at which airliners travel can allow inference of such travel.

Although different types of conveyances may travel at similar velocities, the person's current platform can be determined through further analysis. For example, boat transport can be assumed if the GPS-reported locations are over water with a rapid or relatively rapid rate of movement.

GPS-reported movements at high rates of speed, with some complete stops, can be matched to a map to identify train travel, while movement that matches a bus route can be used to identify bus travel.

In embodiments of the invention in which available sensor data is more restricted (e.g., where no GPS receiver is active), inference of a transportation mode and/or other operations may be omitted.

In operation 212, the person's initial torso orientation and orientation delta may be inferred or calculated, based on the person's assumed state, the device's assumed orientation, and/or other information.

For example, if the device has a GPS component and the person has been inferred to be riding in a car or walking, his orientation can be calculated using GPS location data plus accelerometer data. Specifically, in these cases (and in other scenarios) the person can be assumed to be facing the direction of movement. Therefore, his orientation relative to magnetic north will match the difference between the velocity vector and magnetic north; this difference is the initial orientation delta.

Without a GPS component, the person's orientation may be determinable using only accelerometer data, depending on the device's orientation or state. In these embodiments of the invention, principal component analysis (PCA) can be performed on motion energy to determine the direction of movement, as needed. In particular, when walking, the person's orientation is assumed to match the direction of movement, as determined through PCA.

However, the person could be facing forward or backward along the vector identified by PCA. Therefore, the sensor data may be examined via heuristic rules and/or machine-learned functions.

For example, a heuristic may detect signals of relatively high magnitude at data points whose projections onto the PCA line are at an extreme, relative to the mean of the projected points. These higher magnitudes can be attributed to individual footfalls, which can be used to identify the person's direction of movement. Alternatively, a learned function might directly associate a vector direction with a pattern of data or a data projection. As described above, for other device orientations/state (e.g., held to person's ear, held in hand, carried pants pocket while sitting), the person's orientation is directly determined from the device's observed or assumed orientation. Specifically, for these device orientations, an initial delta orientation can be calculated or assumed.

As described above, for other device orientations/state (e.g., held to person's ear, held in hand, carried pants pocket while sitting), the person's orientation is directly determined from the device's observed or assumed orientation. Specifically, for these device orientations, an initial delta orientation can be calculated or assumed.

In operation 214, at a later point in time, the person's current orientation is determined based on the device's immediate orientation (determined from its sensors) and the initial orientation delta, as long as conflicting sensor data has not eliminated confidence that the delta is still valid.

Thus, as the device's location changes in understood ways (e.g., while the person walks) the person can be assumed to maintain the same orientation relative to the device. Conflicting sensor data, or possibly an extended period of time with relatively no motion, may lead to an assumption that the person's orientation is unknown and cannot be determined from the device's location or orientation. This state may persist until recognized data are again observed.

Data reported by the accelerometer may also be used to identify some events or activities the person may encounter, and which may or may not require re-calibration of the person/device orientation delta. For example, traversal of stairs may yield distinctive data patterns, and be used to modify the delta. Or, such motion may be ignored, as the person will be assumed to return to an upright position after using the stairs.

As another example, when the person sits down while facing a particular direction, and the device is in his pocket, the sensor data may detect a change in device orientation of approximately 90 degrees. The person/device orientation delta can then be adjusted accordingly, or the orientation data may be placed into an unknown state until he stands up again.

Illustratively, an accelerometer with a low-pass filter to detect the direction of gravity may with a determination that the person has seated himself. Similarly, when he again stands up, the opposite change in device orientation will be observed and the orientation delta can again be updated.

In some embodiments of the invention, a model of sitting (or other orientation or activity) could be developed and used to predict likely rotational or other translocation of the portable device caused by motion observed while in this position. The action may be identified through analysis of accelerometer data or by integrating Euler angles, if the complete rotational transformation between the device and the person's orientation is known.

If the device's orientation changes in a manner consistent with the user's movement when exiting the vehicle (e.g., ninety degree rotation to the left, increase in altitude), this orientation delta may be assumed to remain valid (e.g., the device may be in her pocket), but may be adjusted to allow for the user's translation into a standing rather than seated position.

Thus, events that match known patterns of activity can be observed without altering the assumption that the initial orientation delta is still accurate, or can be used to update the orientation delta or calculate a new, current orientation delta.

However, other events may be detected that will make the current orientation delta invalid, in which case the person's orientation cannot be calculated from the device's orientation until another calibrating event is detected. For example, if the device's orientation or accelerometer data indicates a pattern of movement incompatible with walking or other human activity that cannot be accomplished without significantly altering the initial orientation delta, then the assumed orientation delta must be abandoned until another recognizable set of data are observed (e.g., when the person again walks in a relatively straight direction).

Illustrative activities that may require calibration or determination of a new person/device orientation include removal of the device from the person's pocket, use of the device, re-positioning of the device, setting the device down or other separation of the device from the person) and any other activity accompanied by sensor data that cannot be attributed to an event consistent with maintenance of the person/device orientation delta.

As described previously, in some embodiments of the invention, data from a portable device's sensors are processed on the device to determine the compass orientation of a person transporting the device. Thus, besides sensors for detecting orientation, location and movement, the device may also comprise logic for analyzing the data and a processor for executing the logic and possibly controlling one or more of the sensors.

In other embodiments, apparatus for determining a person's compass orientation from sensor data generated by her portable device may operate external to the device.

Figure 3:
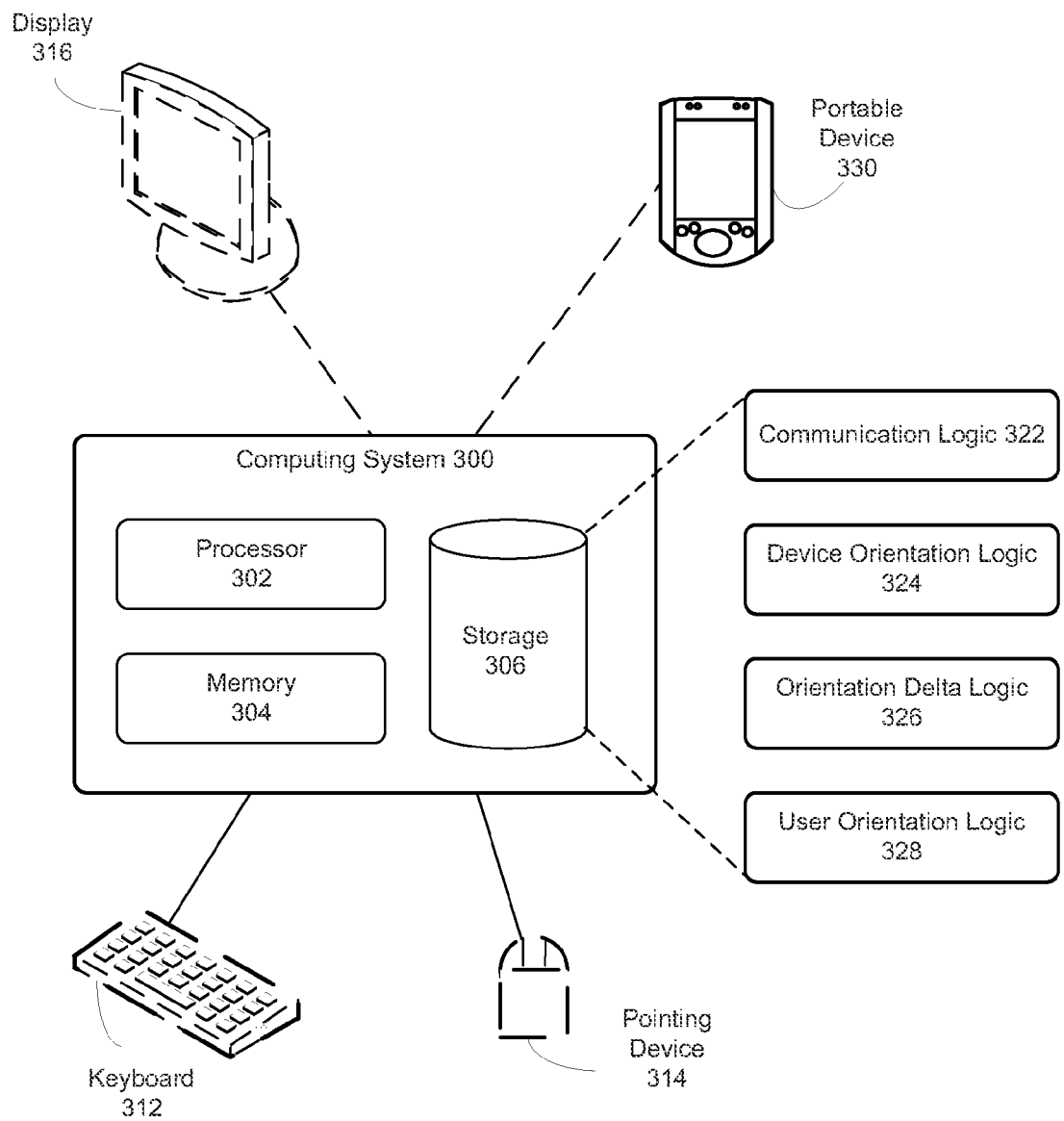
FIG. 3 is a block diagram of a computer system for determining a person's compass orientation from sensor data generated by a portable device transported by the person, according to some embodiments of the invention.

FIG. 3 is a block diagram of a computer system for determining a person's compass orientation from sensor data generated by a portable device transported by the person, according to some embodiments of the invention.

Computing system 300 of FIG. 3 comprises processor 302, memory 304 and storage 306, which may comprise one or more optical and/or magnetic storage components. Computing system 300 may be coupled (permanently or transiently) to keyboard 312, pointing device 314 and display 316.

Storage 306 of the computing system stores logic that may be loaded into memory 304 for execution by processor 302. Such logic includes communication logic 322, device orientation logic 324, orientation delta logic 326 and user orientation logic 328. Additional logic may be stored and executed in other embodiments of the invention.

Communication logic 322 comprises processor-executable instructions for communicating with a user's portable device 330 that comprises various sensors (e.g., for orientation, location and/or movement). In some embodiments, communication between portable device 330 and computing system 300 is performed wirelessly using a data link.

Device orientation logic 324 comprises processor-executable instructions for identifying or calculating the orientation of the portable device. For example, using data produced by an orientation sensor within the device (e.g., a compass, a gyroscope), the device orientation logic can operate to determine which direction the device is "facing". This may require reference to a collection of data describing characteristics of the device or embedded sensor.

In particular, sensors may be embedded with different orientations or references between a sensor and a "face" or given axis of the device. Simply determining which direction is North from the device, for example, does not allow one to determine the device's orientation if the orientation of the sensor within the device is unknown.

Orientation delta logic 326 comprises processor-executable instructions for calculating or estimating a current delta or difference between the orientations of the portable device and the user transporting the device. Depending on one or more events recorded by the sensors (e.g., movement, powering on, powering off, use of the device to place a call), an orientation delta may be observed or assumed directly (e.g., when the user turns the device on or uses it). In other scenarios, an orientation delta may be calculated as a difference between the orientations of the device and the user, as determined from sensor data generated by the device.

User orientation logic 328 comprises processor-executable instructions for calculating or otherwise determining the compass orientation of a user transporting the portable device. In some scenarios or embodiments of the invention, an initial user orientation may be determined directly from sensor data produced by the device, and then used to calculate an orientation delta that can later be used to calculate the user's orientation (from the device's orientation) when the user's orientation cannot be determined directly.

In other scenarios or embodiments, an orientation delta is first determined, observed or assumed (e.g., based on an event or a device activity), and may be used to calculate the user's orientation from the device's orientation. The orientation delta may be updated to reflect movement of the device relative to the user.

The environment in which a present embodiment of the invention is executed may incorporate a general-purpose computer or a special-purpose device such as a hand-held computer or other portable electronic device. Some details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer-executable method of determining a current orientation of a person from a portable device transported by the person, the method comprising:

determining, by a computer, a current orientation of the portable device, wherein the computer includes a user orientation logic;

determining a state of the person from sensor data collected by the portable device, wherein the determined state specifies a mode of transportation of the person;

determining the current orientation of the person from the current orientation of the portable device and the determined state of the person, wherein the current orientation of the person is a torso orientation; and wherein, said step of determining the current orientation of the person comprises applying to the current orientation of the portable device a current orientation delta identifying a difference in orientation between the portable device and the person.

2. The method of claim 1, wherein the orientation of the person comprises a compass orientation.

3. The method of claim 1, wherein determining the current orientation of the portable device comprises analyzing data produced by an orientation sensor within the portable device.

4. The method of claim 1, wherein said determining the current orientation of the person comprises:

gathering data from a location sensor operating within the device; and analyzing the gathered data to identify a direction of movement of the person.

5. The method of claim 1, wherein said determining the current orientation of the person comprises:

gathering data from an acceleration motion sensor operating within the device; and analyzing the gathered data to identify a direction of movement of the person.

6. The method of claim 1, further comprising, prior to said determining the current orientation of the portable device:
identifying an initial orientation of the portable device;
identifying an initial orientation of the person from movement of the portable device; and
calculating an initial orientation delta as a difference between the initial orientation of the portable device and the initial orientation of the person.

7. The method of claim 6, wherein said identifying an initial orientation of the person comprises identifying a direction in which the person is moving.

8. The method of claim 1, further comprising, prior to said determining the current orientation of the portable device:
identifying an initial orientation of the portable device;
detecting a known event of the portable device; and
from the known event, identifying an initial orientation delta as a difference between the initial orientation of the portable device and the person.

9. The method of claim 8, wherein said known event comprises activation of the device.

10. The method of claim 8, wherein said known event comprises use of the device.

11. The method of claim 8, further comprising:
calculating a change in orientation of the portable device from the initial orientation of the portable device to said current orientation; and
calculating a current orientation delta from the initial orientation delta and said change in orientation.

12. The method of claim 1, wherein:
said determining the current orientation of the portable device comprises identifying a mode of movement of the person and the device; and
said determining the current orientation of the person comprises identifying a subset of sensors within the portable device that produce data from which an orientation delta describing a difference in orientation between the portable device and the person can be calculated.

13. The method of claim 12, wherein said determining the current orientation of the portable device further comprises identifying, from a sequence of locations of the portable device identified by the subset of sensors, a manner in which the portable device is being transported.

14. A non-transitory computer-readable storage medium storing instructions that, when executed by a processor, cause the processor to perform a method of determining a current orientation of a person from a portable device transported by the person, the method comprising:
determining a current orientation of the portable device;
determining a state of the person from sensor data collected by the portable device, wherein the determined state specifies a mode of transportation of the person;
determining the current orientation of the person from the current orientation of the portable device and the determined state of the person, wherein the current orientation of the person is a torso orientation; and
wherein, said step of determining the current orientation of the person comprises applying to the current orientation of the portable device a current orientation delta identifying a difference in orientation between the portable device and the person.

15. A portable electronic device for determining a current orientation of a person transporting the portable electronic device, the device comprising:
an orientation sensor;
a location sensor;
a motion sensor; and
a processor configured to:
collect sensor data generated by one or more of the orientation sensor, the location sensor, and the motion sensor;
determine a current orientation of the portable device from the collected sensor data;
determine a state of the person from the collected sensor data, wherein the determined state specifies a mode of transportation of the person;
determine the current orientation of the person from the current orientation of the portable device and the determined state of the person, wherein the current orientation of the person is a torso orientation; and
wherein, said step of determining the current orientation of the person comprises applying to the current orientation of the portable electronic device a current orientation delta identifying a difference in orientation between the portable electronic device and the person.

16. The portable electronic device of claim 15, further comprising: an air pressure sensor;
wherein the processor is further configured to analyze sensor data generated by the air pressure sensor.

17. The portable electronic device of claim 15, further comprising:
a communication module configured to transmit the sensor data toward an external computing device.

18. The portable electronic device of claim 15, further comprising:
a communication module configured to transmit the person's compass orientation toward an external computing device.

* * * * *